(12) United States Patent
Bhagia et al.

(10) Patent No.: US 7,844,945 B2
(45) Date of Patent: Nov. 30, 2010

(54) SOFTWARE AND FIRMWARE ADAPTATION FOR UNANTICIPATED/CHANGING HARDWARE ENVIRONMENTS

(75) Inventors: Sunil A. Bhagia, Portland, OR (US); Steffen C. Hulegaard, Tiburon, CA (US)

(73) Assignee: Avocent Fremont Corp., Redmond, WA (US)

( * ) Notice: Subject to any disclaimer, the term of this patent is extended or adjusted under 35 U.S.C. 154(b) by 620 days.

(21) Appl. No.: 11/195,868

(22) Filed: Aug. 3, 2005

(65) Prior Publication Data

US 2006/0031815 A1 Feb. 9, 2006

Related U.S. Application Data

(60) Provisional application No. 60/599,088, filed on Aug. 4, 2004.

(51) Int. Cl.
*G06F 9/44* (2006.01)
*G06F 9/445* (2006.01)

(52) U.S. Cl. .................. 717/107; 717/121; 717/168; 717/174

(58) Field of Classification Search ................ None
See application file for complete search history.

(56) References Cited

U.S. PATENT DOCUMENTS

| | | | |
|---|---|---|---|
| 4,024,504 A | 5/1977 | Chowning et al. | |
| 6,381,693 B2 * | 4/2002 | Fish et al. | 713/1 |
| 6,401,201 B2 | 6/2002 | Fish et al. | |
| 6,567,866 B1 * | 5/2003 | Poisner | 710/36 |
| 6,598,106 B1 * | 7/2003 | Grieshaber et al. | 710/305 |
| 6,802,063 B1 * | 10/2004 | Lee | 718/1 |

(Continued)

FOREIGN PATENT DOCUMENTS

GB    2396715    6/2004

(Continued)

OTHER PUBLICATIONS

Microsoft, "Plug and Play—Architecture and Driver Support," 3 pages, found at http://www.microsoft.com/whdc/system/pnppwr/pnp/default.mxpx, printed on Jan. 19, 2006.

(Continued)

*Primary Examiner*—Tuan Q Dam
*Assistant Examiner*—Isaac T Tecklu
(74) *Attorney, Agent, or Firm*—Davidson Berquist Jackson & Gowdey LLP (57) ABSTRACT

A method for producing a fixed-size firmware image for a hardware device, parameterized for a plurality of component environments, includes providing a logical description of aspects of said plurality of component environments; providing a physical description of physical aspects of said plurality of component environments; associating said logical description with said physical description; and providing said firmware image to include a plurality of parameterized functions to support said hardware device in each of said plurality of component environments. The hardware device may be a power supply, bus; fan, disk drives, sensor, or flash part. Actual arguments to said parameterized functions are bound at run time and may be provided as untyped blocks of bits. The firmware image may include an operational block including abstract device driver interfaces for said hardware device; and a description block that includes said logical and physical descriptions.

17 Claims, 4 Drawing Sheets

U.S. PATENT DOCUMENTS

| | | | |
|---|---|---|---|
| 6,820,184 B2 * | 11/2004 | Russo et al. | 711/170 |
| 6,848,046 B2 | 1/2005 | Zimmer | |
| 7,036,007 B2 * | 4/2006 | Schelling et al. | 713/1 |
| 7,178,141 B2 * | 2/2007 | Piazza | 717/168 |
| 7,185,309 B1 * | 2/2007 | Kulkarni et al. | 716/18 |
| 7,367,016 B2 * | 4/2008 | Meyer et al. | 717/114 |
| 2003/0217358 A1 | 11/2003 | Thurston | |
| 2003/0233536 A1 * | 12/2003 | Chheda et al. | 713/1 |
| 2004/0268295 A1 | 12/2004 | Culter | |
| 2004/0268340 A1 * | 12/2004 | Steeb et al. | 717/174 |
| 2006/0015844 A1 * | 1/2006 | Johnson et al. | 717/106 |

FOREIGN PATENT DOCUMENTS

| | | |
|---|---|---|
| WO | WO 99/22295 | 5/1999 |

OTHER PUBLICATIONS

Andrews et al.: "Managing Component Variability with a Firmware Calibration Model; Reduced Manufacturing Costs and Freedom in Vendor Selection" Electrical and Computer Engineering, 2005. Canadian Conference on Saskatoon, SK, Canada May 1-4, 2005, Piscataway, NJ, USA, IEEE, May 1, 2005, pp. 1985-1987, XP010869420 ISBN: 978-0-7803-8885-7.

Anonymous: "Firmware Interface Table Architecture" Research Disclosure, Mason Publications, Hampshire, GB, vol. 429, No. 49, Jan. 1, 2000, XP007125334 ISSN: 0374-4353.

EP Appln. No. 05784966.3—Dec. 14, 2009 EPO Extended European Search Report.

International Business Machines Corporation: "Early Determination of the System Type to Support Single Firmware Image on Multiple Systems" Research Disclosure, Mason Publications, Hampshire, GB, vol. 431, No. 173, Mar. 1, 2000, XP007125834 ISSN: 0374-4353.

Malaysian Patent Appln. No. PI20053632, Substantive Examination Adverse Report, Intellectual Property Corp. of Malaysia, Oct. 2, 2009 [4 pgs.].

International Search Report and Written Opinion mailed Sep. 24, 2008 from PCT/US05/27793.

* cited by examiner

SOFTWARE AND FIRMWARE ADAPTATION FOR UNANTICIPATED/CHANGING HARDWARE ENVIRONMENTS

RELATED APPLICATIONS

The present invention is related to and claims priority from U.S. Provisional Application No. 60/599,088, filed Aug. 4, 2004, titled "Software And Firmware Adaptation For Unanticipated/Changing Hardware Environments," the contents of which are fully incorporated herein by reference.

FIELD OF THE INVENTION

The present invention relates to computer systems in general. More particularly, the present invention relates to firmware for unanticipated/changing hardware environments.

BRIEF DESCRIPTION OF THE DRAWINGS

The invention is better understood by reading the following detailed description with reference to the accompanying drawings in which, when appropriate, like reference numerals and characters are used to designate identical, corresponding or similar components in differing drawings and in which.

DETAILED DESCRIPTION OF PRESENTLY PREFERRED EXEMPLARY EMBODIMENTS

In the detailed description to follow, although exemplary components are given, the present invention is not limited to the same. While example embodiments of the present invention are described, the present invention is not limited to use with such arrangements, and may be used in differing arrangements within a processing system. Unless specifically otherwise stated, as used herein, the terms "include" and "includes" are non-exclusive or restrictive.

BACKGROUND & OVERVIEW

A typical computer system includes a number of hardware devices, each of which needs to be controlled. Such devices are typically controlled by low-level control programs (sometimes referred to as firmware) embedded in microprogrammable processors. As used herein, the term "computer system" refers to any system that includes at least one processor. Thus, a computer system according to embodiments of the present invention includes personal computers, mainframes, PDAs (Personal Digital Assistants), and associated peripherals and hardware components relating to the operation of the systems. A computer system according to embodiments of the present invention may be embedded in a appliance, a desk-top box or in any other kinds of device. The peripherals may include external memory devices such as memory cards, disks, and the like; video and audio input and output devices; printers and the like. The hardware components include power supplies, various types of busses; fans, disk drives, sensors, flash parts and the like.

Firmware is typically stored in a non-volatile type of storage such as a flash memory, but embodiments of the present invention are not limited thereto. Instead the firmware may alternatively be stored in a read-only memory (ROM), non-volatile RAM (NVRAM), etc.

In most computer systems, firmware is highly customized to the specific hardware device it operates/controls. Accordingly, when hardware is changed and/or added to a computer system, the firmware usually has to be changed. The inventors of the present invention were the first to realize that, instead of installing new or updated firmware every time hardware in a computer system is modified (added, changed, removed, upgraded), a single firmware program may be developed to deal with and adapt to unanticipated/changing hardware environments.

In order to provide essentially generic firmware, according to one aspect of the present invention, first hardware devices are categorized and generalized according to their overall function. There are a finite number of general types of peripheral devices (such as, e.g., power supplies, fans, disk drives, sensors, flash parts, etc.). Next, it is preferable to distinguish between devices physical aspects and their logical aspects. In this manner, both physical and logical descriptions of generic devices may be obtained or derived. A complete hardware device description may be obtained using a logical description with a corresponding physical description.

With the physical and logical device descriptions for various types of devices, a common firmware prototype can be derived which supports the generalizations regarding the particular device types. This prototype is then parameterized to support the various actual devices with which it might be used. To begin with, the implementation of this prototype can be stubbed to implement a virtual/non-existent peripheral device (of the type in question).

The general types of peripheral hardware devices recognized reflect the range of intended applicability for the given embedded software/firmware part. The part, may be, for example, one that implements some form of hardware manageability logic on some sort of embedded microcontroller. In this case, the peripheral devices will tend to be things like sensors (for temperature, voltage, current, chassis-intrusion, etc.), fans, LEDs (light-emitting diodes), and the like. Of course, the present invention is not limited to any particular set of recognized peripheral devices.

As noted above, a complete description of a peripheral hardware environment includes both a logical and a physical description, (a physical description is paired with a corresponding logical description to provide a complete description). The physical description may include things like the number and assignment of output pins on a chip, the memory locations of certain data, various clock and timing parameters, temperature parameters and the like.

Figure 1:
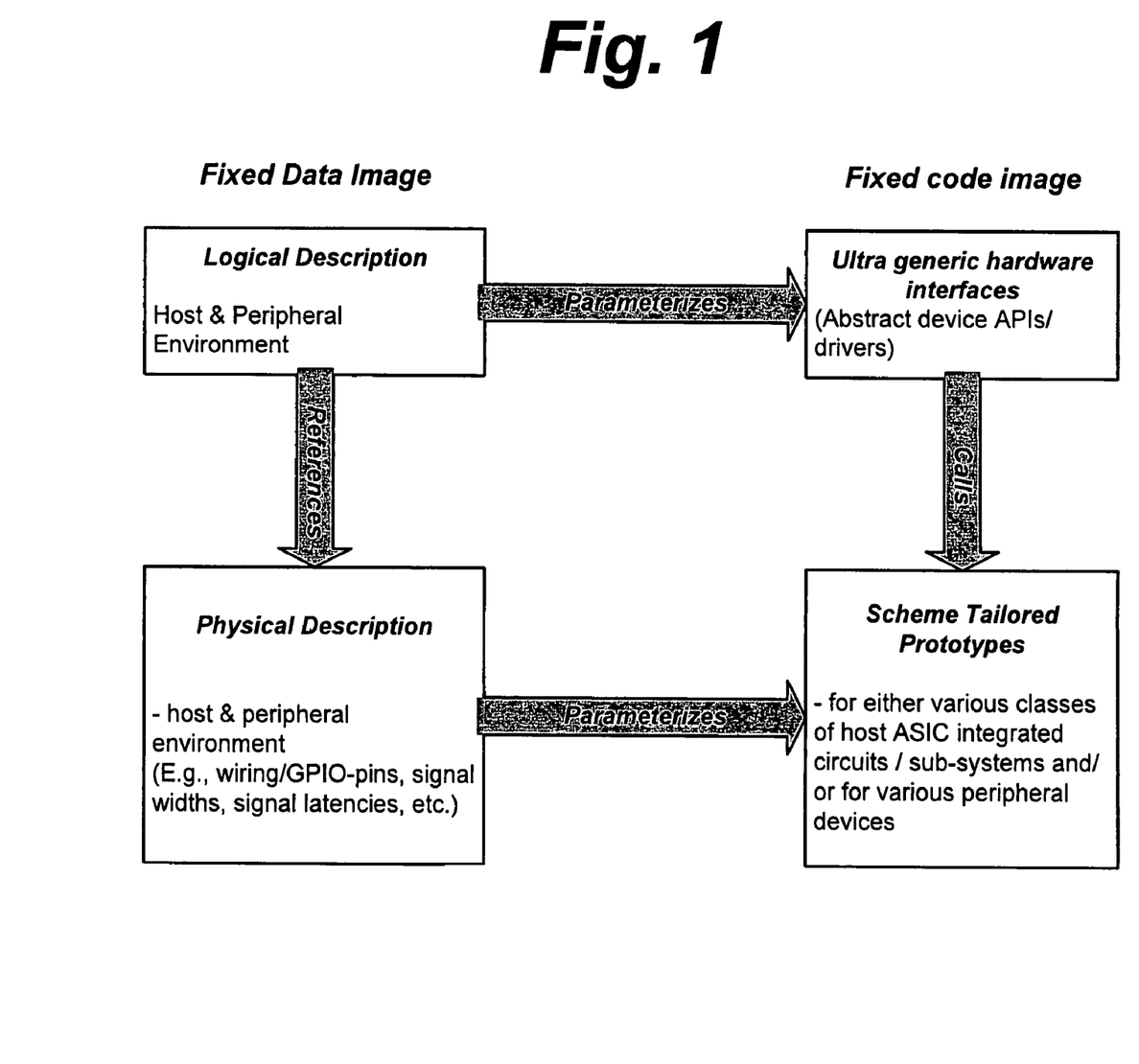
FIG. 1 depicts an exemplary conceptual architecture according to embodiments of the present invention.

FIG. 1 depicts an exemplary conceptual architecture according to embodiments of the present invention. The figure depicts the division of the component scheme into a logical and physical portion. It depicts the use of a common default/prototype interface and the use of a complementary physical level scheme. Together, the logical scheme and the physical scheme form a complete description of a given instance of the component prototype.

For the sake of simplicity, this figure omits the ability of any given component to be composed of an arbitrary assembly of subordinate components.

EXAMPLE

Power Supply

Various aspects of the present invention are described in the context of a particular example—a power supply. Those skilled in the art will realize that this example is not meant to limit the scope of the invention in any way, and is given for explanatory purposes.

A power supply is a component of every computer system and of every peripheral device. The Power Supply example used here illustrates how component assemblies can be affected via one particular default/prototype scheme used for a wide range of (electrical) "PowerSupply" components. Power supplies come in many different flavors. Some have self-contained intelligent management sub-systems, while others do not. Some power supplies are actually power supply systems with multiple power supply units within them. The range of specific power supply types is surprisingly long. According to embodiments of the present invention, however, all these specific power supply types may be treated as some sort of generic, logical (electrical) power supply. Consider, for example, the electrical power supply of a peripheral device.

Generic methods are parameterized with both logical and physical power supply descriptions. The prototype has flexible implementations for each behavioral facet/method/slot. As used herein, a "facet" is defined to be either a reference to some operational (run-time) behavior or a reference to a certain attribute/property/datum (about the current state of the corresponding peripheral hardware device). It is preferably possible for any behavior/method/slot to be substituted for any other. According to embodiments of the present invention, it is possible for one logical instance to be composed of a graph of subordinate logical instances (according to the scheme for peripheral in question).

Interfaces for any given general type are required to carry a certain expected number of software/firmware interface facets. As noted above, peripheral hardware devices run a gamut from fans to sensors (of various increasingly specialized types), and include LEDs, LCDs (Liquid-Crystal Displays), modems, NICs (Network Interface Cards) (or individual MAC/PHY chips) and more.

Returning to the example of a certain power supply device, it is expected that all electrical power supplies will support the following logical facets:
1. Power Initialization (possibly a "do-nothing" facet if nothing is required);
2. Power Information (power related information in a certain data format);
3. Power On (activate/start/turn-on);
4. Power Off (de-activate/stop/turn-off);
5. Power Reset;
6. Power Cycle (typically (a) power-on, (b) pause, (c) power-off); and
7. Power Status (the current power status).

A corresponding physical description/implementation to drive the implementation logic behind these logical facets is provided below, along with a description of how these logical facet implementations eventually bind to physical electrical signaling interfaces. For the purposes of this illustration, focus on the following select list of expected power supply (sub-system) facets.

For the sake simplicity of this illustration, further/additional interface facets (i.e., features/functions) that certain, particular and/or specific types of power supplies might (or might not) provide are not described. Besides, this restraint can contribute to the range of power supply peripherals can be modeled with this particular scheme. Importantly, the present invention circumvents the need for any more specific types of power supply models.

The present invention generally requires that any associated peripheral (and/or host) device be described (both logically and physically) within an embedded software/firmware part. When there is an associated power supply (peripheral device), then the embedded software/firmware part must populate a certain logical power supply description. The following is an example of a particular logical schema used to describe all (electrical) power supplies:

Logical Power On Signal (to turn power on)
Logical Power On Signal Width (i.e., duration)
Logical Power Off Signal (to turn power off)
Logical Power Off Signal Width (i.e., duration)
Logical Power Reset Signal (to reset power)
Logical Power Reset Signal Width (i.e., duration)
Logical Power Status (to read current power status—true/false state)
Logical Interrupt Request (IRQ) type (for external button push event)
Logical Interrupt Request number (an IRQ discriminator)
Logical Interrupt Request Interpretation (activation, de-activation or both)
<Logical Descriptors of Behaviors> (e.g., function/method signatures)

Figure 2:
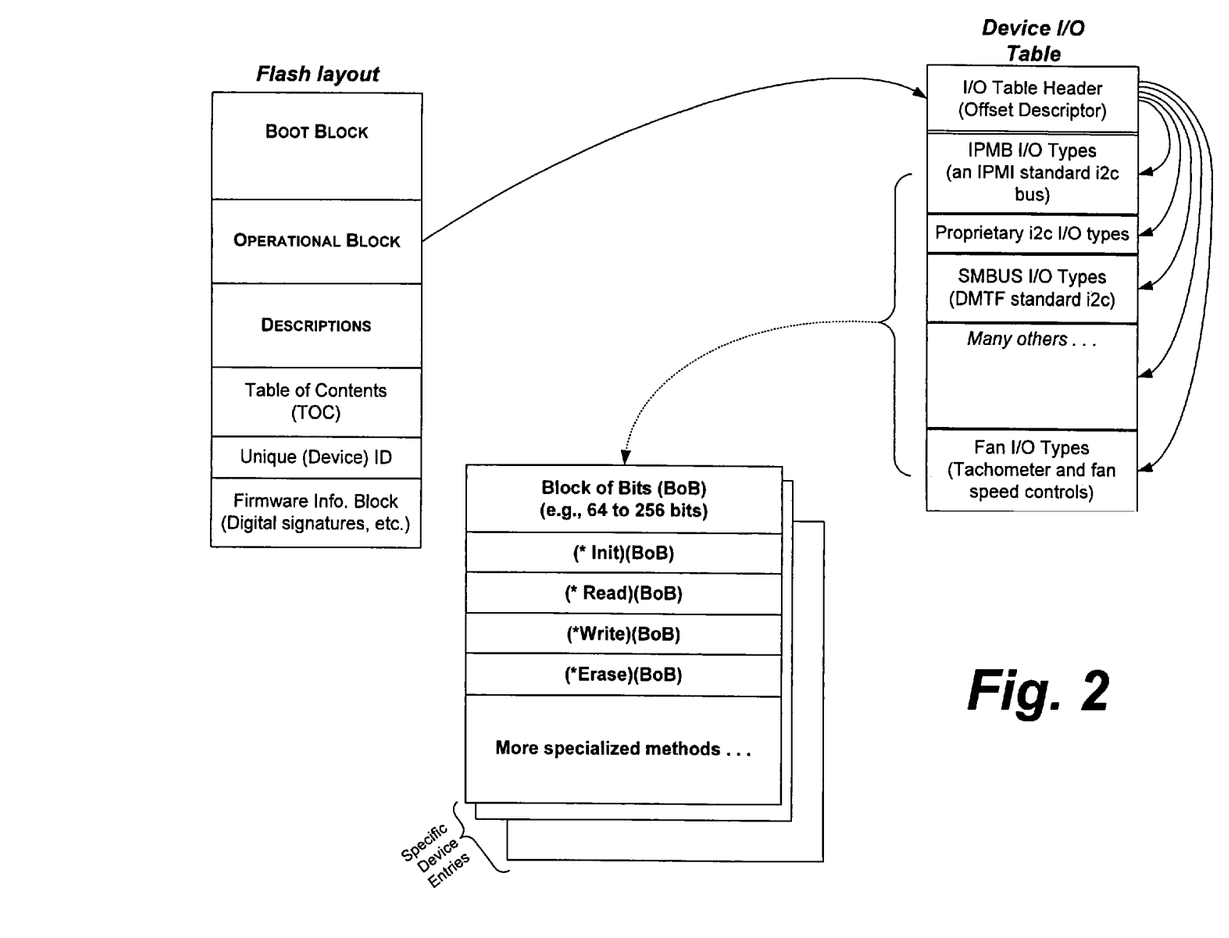
FIG. 2 depicts an exemplary implementation of aspects of embodiments of the present invention.

Each of the enumerated descriptive attributes parameterizes the <Logical Descriptors of Behaviors>. Each of these enumerated descriptive attributes appears (packed into) a certain block of bits ("BoB"—described in greater detail below). One implementation of the <Logical Descriptors of Behaviors> is illustrated in FIG. 2.

As used herein, the structural conventions of each logical description are referred to as a "scheme" (singular). The terms "schema" (plural) and "schemata" (plural) are used to refer to some collection of schemataes. (So the present example describes a Power Supply scheme.) Combining the Power Supply scheme of the present example with schemata used for other sorts of peripheral devices, allow composition of (or build-up) a more comprehensive peripheral device schema. In turn, if the peripheral device schema is combined with a host processing support component scheme, then the result can be considered a singular, comprehensive, embedded system schema.

If (as may happen on rare occasions) one of the logical description facets can not be sensibly supported by some specific type of scheme, a facet can be stubbed with some appropriately innocuous implementation. A classic stub always succeeds as an implementation (a stub is a useful default implementation). The various schemata according to embodiments of the present invention permit some facets to be mandatory and while others are optional. In addition, default stubs are provided for most optional facets. If a given description omits them, the default applies. In many cases, this technique permits the invention to support otherwise incompatible (specific) types of power supplies. Judicious use of stubs can force a wide range of Power Supplies to meet a schemes expectations.

Fixed Executable Images & the Logical Schema

All peripheral devices may be described according to some generalized facet scheme. Each logical type of peripheral device matches one of these generalized facet templates (referred to herein as schemes). While this technique can be used in any number of contexts, and while the types of schemata used can vary as widely, each application context is best served by some correspondingly optimized collection of schemata. For instance, there is no reason to support voltage sensors in devices/products that will never include even a single voltage sensor.

As a result, it is possible to predefine a limited schema that makes provision for describing only those types of hardware peripherals that are applicable (and/or expected) for a given (application) context. One may choose to include additional schemata to increase the range of applicability (of the resulting firmware/software "part"). The expressive range of the chosen schema maps to the expected range of applicability for the corresponding embedded software/firmware/host part.

A predetermined, maximum number of logical peripheral device description instances are also employed. While the maximum number chosen is arbitrary, the present invention can leverage this chosen number of descriptions. As a practical matter, this means that different embedded software/firmware parts can reserve arbitrary—but a priori—known amounts of non-volatile (NV) storage. This fixed amount chosen tends to correspond to the maximum number of logical (and/or physical) description instances that might ever be needed (in a given application context). This maximum is preferably chosen to be large enough to cover most/all physically feasible peripheral device configurations. Although the storage size is preferably fixed, according to embodiments of the present invention storage may, alternatively, be dynamically allocated. Accordingly, the embedded firmware/software part can be either a fixed size or variable.

Those skilled in the art will realize that the maximum number of description instances permitted is often a function of costs associated with the product in which a given firmware/software part is to be embedded. While additional non-volatile storage chips can expand the operational host hardware environment (for embedded software/firmware parts), such additional chips will increase the cost.

While the present invention works with arbitrary amounts of dynamically allocated storage, those skilled in the art will realize that the present invention works when an arbitrary-but-fixed number of description entries are required. The present invention works with a tightly capped amount of non-volatile storage. If a maximum number of description instances is chosen, the layout of the embedded firmware/software's executable image does not change. A build-time option for choosing this maximum number of description entries is thus a part of embodiments of the present invention.

Free-Form Description Binding

Embodiments of the present invention employ run-time binding through so-called "function pointers" in order for the embedded software/firmware code to bind to the proper logical interface for any given peripheral component. Generally the build-time compiler's calling conventions are followed, whereby each logical hardware component description supplies a handle (e.g., a memory address) to a device type/schema specific data structure. This data structure, in turn, maps to various device description-specific behaviors (e.g., function pointers).

The logical interfaces, according to embodiments of the present invention, are parameterized. This allows generalizations about a logical category of peripheral hardware components, such as Power Supplies, and permits many different ways to communicate with all of these diverse devices.

Preferred embodiments of the present invention pass a number of opaque bits as an argument/parameter to each (and all) of our logical behavior facets. The inventors have found that somewhere between 64 and 256 bits will often suffice for most arguments/parameters (if tightly packed bit fields are used aggressively). Those skilled in the art will, of course, realize that the precise number of bits depends upon the system schema in question.

This parameter passing approach allows the invention to handle both the variable numbers, and the variable types, of behavior (e.g., function/method) parameters (e.g., function/method arguments). When describing very general concepts, like power supplies, it is often the case that more specific sub-types of power supplies will need vastly different numbers, and different types, of parameters. Rather than the need to re-code/re-program, the present invention adopts a prototype based approach. All prototype behaviors need to have an interchangeable and/or standard interface.

Recall, that embedded firmware/software parts should preferably not have to be rebuilt (i.e., re-compiled/interpreted) when changes are made to the system. They must directly work with the variable numbers of interface arguments.

As an example, assume that a block of bits in a particular implementation is 64-bits. These 64 bits are typically pushed (often as machine words or dual machine words) onto the function call (stack frame) associated with each logical interface invocation (at run-time). These 64 bits are interpreted as different numbers and/or different types of parameters. The precise manner in which they are interpreted depends upon the logical scheme in question. Sometimes a portion of these opaque bits are interpreted based on the specific physical description of the scheme in question. FIG. 2 illustrates an example of the manner in which these block of bits can be supported according to embodiments of the present invention. Those skilled in the art will realize that here are many possible ways to implement this invention. Different programming language run-time facilities will tend to favor different implementations. FIG. 2 illustrates one way to implement the common prototypes within a (possibly fixed-size) operational block, using the C programming language.

Although some microprocessors directly support 64-bit machine words, the exact number of opaque bits used is arbitrary. This depends upon the system scheme to which the invention is applied. The approach works equally well with any number of bits. As needs arise, the number of opaque bits passed (to all described facets in the schema used for any particular embedded software/firmware part) can be expanded. Those skilled in the art will realize that the block of bits is preferably not typed.

Regardless of the number of bits used, for preferred embodiments of the present invention, the number should be a constant for a given part. In some less preferred embodiments of the present invention, varying number of bits may be used, although this will add to the system's complexity. With a fixed number of opaque bits in the block of bits, each and every behavior facet can always take a single, standard, block-of-bits argument. This is a unique mechanism, and method, for implementing a behavioral facet (or slot). In part, this distinguishes a descriptive facet from an ordinary function, an ordinary object method, etc.

Returning to the power supply example, the following table (Table 1) depicts an example mapping the described Power Supply (logical) concept into the block of (opaque) bits.

TABLE 1

Logical Power Supply Description (Block of bits only)

| Section/Bit Offset | # bits | Purpose | Sample Value |
|---|---|---|---|
| 1 | 16 | Packed Bit Field | 0x0404 |
| 15:8 | 8 | Logical Power On (GPIO) Signal | 0x04 |
| 7:0 | 8 | Logical Power Off (GPIO) Signal | 0x04 |
| 2 | 16 | Packed Bit Field | 0x0605 |
| 15:8 | 8 | Logical Power Status (GPIO) Signal | 0x06 |
| 7:0 | 8 | Logical Power Reset (GPIO) Signal | 0x05 |
| 3 | 32 | Packed Bit Field | 0x053205FF |
| 31:24 | 8 | Power On Signal Pulse Width | 0x05 |
| 23:16 | 8 | Power Off Signal Pulse Width | 0x32 |
| 15:8 | 8 | Power Reset Pulse Width | 0x05 |
| 7:7 | 1 | Use IRQ instead of signal for power status | 1b |
| 6:6 | 1 | External (true) or Internal (false) IRQ type | 1b |
| 5:2 | 1 | Interrupt Request (IRQ) number | 0x4 |
| 1:0 | 2 | Trigger edges (0 = front, 1 = back, 2 = both) | 10b |

Flexible Description Facets

To optimize existing implementations, a number of techniques may be used to compress varying numbers, and varying types, of arguments/parameters into a sequence of bit fields packed (tightly/efficiently) into the block of bits. To completely standardize the unique interface facet signatures, some embodiments of the present invention adopt a certain universal enumeration of interface facet that returns values (referred to as "status" values). In addition, systems according to embodiments of the present invention preferably use a conformant function to implement both state/attribute/property access facets (e.g., so-called "getters" and "setters") and behavioral facets.

Thus far, a logical description approach (via a specific scheme conforming to some specific schema conventions) has been described. This supports instances of various prototypes. Each such instance can represent one peripheral hardware device.

While this novel mechanism/method can be applied in any number of ways, the power supply example shows how it supports the representation of a very large number of Power Supply types. The logical interfaces of the Power Supply type have been parameterized in a single, uniform and consistent way, e.g., using an opaque block of bits. The present invention makes it possible for a fixed software/firmware image to use any interface facet that is associated with any scheme instance. Diverse schemes can represent a very wide range of peripheral devices (within a peripheral device schema). These mechanisms, and the corresponding methods, provide a constant and a consistent way to bind an implementation to the described facets.

Declarative Description Facet Signatures

Up to now, the block of bits have been described as opaque. The power supply example is now used to illustrate how other mechanisms, and methods, in the present invention support real-world power supply idiosyncrasies.

The block-of-bits argument/parameter is associated with the specific set of facets that meet the stated/implied requirements/intentions of some given logical/physical scheme (for Power Supply). Focus first on the logical facets required by the power supply scheme. This logical description outlines the set of Power supply facets/interfaces that power supplies must somehow support. It is the associated Power Supply scheme that determines how the block of bits will be interpreted. Once it is known that we are dealing with an instance of a Power Supply description, the block of bits can be interpreted. The block of bits is not opaque to logic that knows the Power Supply context (for some given block of bits instance).

The interpretation of various, nested sections of the block of bits can build up across the generalization/specialization type hierarchy. To keep the example simple, assume that each specialized (leaf) type (like Power Supply) can treat the entire block of bits as its own, as is often the case. For instance, the even more general notion of a peripheral (kind of type) might not impose any additional conventions upon the block of bits interpretation.

In the example, the Power Supply type declares and imposes its own special block of bits interpretation (as was detailed in Table 1 (above)). The actual values used within this block of bits describe the many possible differences that exist between diverse specific types of the general/generic Power Supply type. Sample values for a hypothetical power supply were shown in Table 1.

A Power Supply device might have a notion of power control pulse widths (an unlikely notion in other sorts of peripherals). Power On/Off" control is a concept utterly foreign, and inapplicable, to most other types of (peripheral) devices. For instance, sensors (in general) or temperature sensors (in particular) do not typically have any notion of "Power On/Off" control. Neither power-on/off behaviors, nor the associated electrical signal pulse widths, apply to (peripheral) devices in general. In addition, specific power supply sub-types require different power on/off electrical pulse widths.

Power Supply instances can also require different specific wiring choices for the interface to any specific Power Supply. This will depend upon how the Power Supply instance in question is situated within some given system/product. How the system/product is laid out will dictate which host wire/pin must be used for any such Power Supply on/off signal (of whatever width or duration). Which wire must be used for the signal (pulse) is a separate, physical-level matter and is described in the physical scheme.

Logical Descriptions Implement a New Type System

In many object-oriented systems, there would be a class to represent each such specific type of Power Supply. Each such class instance could inherit a Power on/off pulse width member (property/attribute) but each class would need different method logic to handle the diverse wiring/interfaces that might be used for any given Power Supply. The present invention makes this unnecessary. Without the present invention, one might (often) need a fast growing number of distinct Power Supply types/classes.

Most other software systems (e.g., object oriented programming languages) generalize based on class/type definitions. This type-based generalization is sensitive to both class member types and class method signatures. A class method signature can include the method's return value type, the number of method arguments, and the types of each method argument. Using the present invention, declaratively tailored prototypes implement the described facets. Techniques like the block of bits make all facet signatures interchangeable which eliminates the need for most sub-typing.

It is only the interpretation of that block of bits that is sub-type specific (i.e., each sub-type promulgates its own block-of-bits format). This allows for consistent interfaces that work with (and in spite of) different numbers of arguments and different types of arguments. Accordingly, prototypes schemes according to embodiments of the present invention can compose things like a (peripheral) devices schema. This provides a far more flexible sort of processing/programming generalization mechanism.

This more flexible sort of processing/programming generalization permits creation of a fixed software/firmware image that can conditionally incorporate simultaneous support for any number of specific peripheral devices. No new device-specific code needs to be loaded (or linked). Systems using the present invention do not require any sort of reboot, restart or even re-initialization. Even run-time adaptation of the fixed part (to a dynamic hardware environment) becomes quite practical. A few simple changes to the data declared (or added) to the schema (of Peripheral Devices in general) will suffice. From another perspective, the collection of description scheme instances (i.e., the schema according to embodiments of the present invention) makes peripheral device support fully data driven.

In terms of the running example, a power on/off pulse width of 100 milliseconds might be a common/default value. A longer, or shorter, pulse width might be required by certain specific types of power supplies. The present invention can handle all such variations.

According to embodiments of the present invention, a single, fixed software/firmware image can include a huge variety of very specific type implementations (by brand, make, model, etc.). Some of the fixed logic can manipulate instances of something quite general—like (Peripheral) Devices. Some can manipulate instances of something a bit less general—like Power Supply Devices, while yet other logic in our fixed images can deal with very specific types—like, e.g., a very specific model/device (e.g., "ACME Power Supply model 12A in a FOO model 2500 server computer").

Due to the super-generalized nature of the schemata (e.g., Power Supply), the present invention offers a unique level of processing/program extensibility. New types can be added both more easily and more powerfully. The schema conventions (i.e., interface contracts) are much less restrictive. Since the individual prototype schemes are more general, new types can more often both conform and interoperate with existing logic. Existing logic is sensitive only to these much looser prototype scheme interfaces (as promulgated by the more general scheme shapes). The present invention provides an unprecedented level of extensibility (i.e., customizability).

Logical Description Artifacts: the "Logical Description Table"

Often, something like a logical description table has a fixed size entry for each instance of any scheme type (e.g., for Power Supply, etc.). A logical description instance/entry represents a scheme instance (e.g., Peripheral Device). The fixed software/firmware image uses the facet interfaces for each listed schema instance (e.g., for each Power Supply scheme instance, etc.). There can be very material (and almost arbitrary) differences between instances of any given scheme type (like Power Supply). Accordingly, much of the described facet machinery is indirect and opaque. Different specific power supply instances can be associated with distinct interface facet sets. In ordinary object oriented programming systems, such different instances would require different Power Supply sub-types. With the prototype based description conventions according to embodiments of the present invention, specific facet schemes can bind to completely different code. In effect, they can bind to sub-type specific implementation logic without requiring any sub-types. The prototype scheme according to embodiments of the present invention is the one and only common thread.

This common thread is kept flexible with mechanisms like the block of bits. All facet signatures within a schema share some arbitrarily unique block of bits. The number of bits is fixed for the entire schema (and thus for each scheme within the schema). Meanwhile, the use/interpretation of these reserved bits is scheme specific.

The interpretation of these bits depends upon the kind of prototype scheme in question. Implementers choose when to declare/define new prototype facet schemes (i.e., when they add/declare new scheme instances). Implementers can thus model device differences either via distinct facet schemes (i.e., by choosing to introduce distinct schemes to the schema) or via distinct parameter/property values (i.e., by changing logical description values for an existing scheme instance).

Physical Schema

Thus far, we have described the use of a declarative, logical description of a peripheral hardware environment. A corresponding physical description (of the peripheral hardware environment) is also needed. The physical description is paired with a corresponding logical description to complete a description.

Returning to the running power supply example, suppose that there is a specific type of power supply in use. To illustrate the variety of physical descriptions often required, suppose that this power supply is controlled through certain general purpose input/output pins (which are available on the given host chip/hardware). Further suppose that there is a second power supply dedicated to some always-on embedded manageability sub-system. Alternatively, a third power supply instance might be an uninterruptible power supply (e.g., driven by batteries).

Although this second power supply instance might be direct wired to the host (operating) platform, like the first one, it might be quite different. At the logical level, the second power supply might not handle any system (board) interrupts at all. It might have no knowledge of front-panel button push events, it might be connected to the host/operational platform using different wires/pins, and it might use different electrical signal pulse widths (and/or triggering conventions).

The single, fixed software/firmware image according to embodiments of the present invention can handle these physical configuration differences just as easily as it does any other differences within a given scheme. As with the scheme differences (discussed above), the present invention obviates any need to change the software/firmware image for these physical/wiring level differences. The present invention can even handle changing hardware environments (e.g., hot-swap) without any software/firmware image changes.

To deal with some of the Power Supply physical aspects stipulated above, the present invention associates each instance of a logical peripheral device (e.g., each power supply) with various features on (or accessed through) the operational/host hardware (e.g., a microcontroller core based Application Specific Integrated Circuit—ASIC). Some peripheral schemes, like the one for power supply, may have facets that need to be associated with ports or pins (or some such physically distinct bit of hardware). Other peripheral schemes, like the one for fans, need to be associated with fan tachometer circuits (for fan speed readings) and other bits of hardware (like pulse width modulator circuits used for fan speed control). In contrast to power supplies, fans associate neither with operational/host ports nor operational/host pins.

The present invention supports support such context sensitive associations (scheme-to-scheme dependency/delegation relationships) via the block of bits (described above) in order to keep the context sensitive details consistent across the entire (system) schema. As described above, this block of bits has an interpretation (i.e., a format) that can vary by the specific scheme (e.g., Power Supply) in question. The specific (prototype) scheme dictates that interface facets. Thus, it dictates just what the block of bits interpretation will be in this scheme context.

Unless the logic knows something about the current scheme, the block of bits is utterly opaque. Much of the code found in any embedded firmware/software image will manipulate any such block of bits as just another collection of bits. Only the scheme-specific logic, like the facet implementation logic, embeds any scheme specific knowledge. Only scheme-specific logic can correctly interpret the block of bits. This scheme specific information/knowledge hiding is important. It forces strong modularity/encapsulation boundaries around each (prototype) scheme within a (prototype) schema.

The block-of-bits values may also vary by scheme. This sort of scheme-specific value is called a reflection value. It reflects and/or represents information common to all instances of given scheme. A portion of every block of bits may be required to be consistent for all sub-schemes of some enclosing, more general scheme. This sort of recursively-nested, sub-scheme (prototype hierarchy) is considered a part of the present invention. Most often, the block of bits values vary for each specific scheme instance. These simply reflect the particular property/attribute values that best describe the scheme instance in question.

With reference again to the running power supply example, many power supplies will use certain bits, e.g., to identify which operational/host ports or pins they use. To keep the example simple, and without any limitation on the scope of the invention, we focus here on a scheme instance for a Power Supply that communicates via operational/host ASIC pins. Such pins carry what are often called general-purpose input/output (GPIO) signals. The subordinate scheme used for (logical) GPIO signals can describe both the classic single-bit GPIO pin and cases where the logical GPIO signal is delivered using multiple GPIO pins (as a crude form of a bus). Such collections of GPIO pins can manifest a so-called bit-banged bus. To keep this example simple, the GPIO Bus Flag is set to false. In other words, the example Power Supply (instance) will use a simple (logical) GPIO signal. This makes all of the GPIO bus related block of bits parameters moot (at least for this particular example Power Supply). All the same, these GPIO bus related parameters are shown (in Table 2 below) to illustrate one particular scheme that has resulted from the application of the present invention.

TABLE 2

Logical Description of General Purpose IO (GPIO) Signal #4 (Block of bits only)

| Section/Bit Offset | # bits | Purpose | Sample Value |
|---|---|---|---|
| 1 | 16 | Packed Bit Field | 0x0060 |
| 15:8 | 8 | Reserved (presently unused) | 0x00 |
| 7:0 | 8 | (Logical) GPIO Pin Number | 0x60 |
| 2 | 16 | Dedicated Bit Field | 0x0060 |
| 15:0 | 16 | GPIO Signal Mask | 0x0060 |
| 3 | 32 | Packed Bit Field | 0x053205FF |
| 31:30 | 2 | GPIO SignalType | 2 |
| 29:29 | 1 | GPIO Bus Flag (1 = true, 0 = false) | 0 |
| 28:25 | 4 | GPIO Bus Bits (# of bit-banged bus bits) | 0x1 |
| 24:17 | 8 | GPIO Bus Port Number | 0x00 |

TABLE 2-continued

Logical Description of General Purpose IO (GPIO) Signal #4 (Block of bits only)

| Section/Bit Offset | # bits | Purpose | Sample Value |
|---|---|---|---|
| 16:9 | 8 | GPIO Bus Bit Location (register + pin) | 0x00 |
| 8:4 | 5 | GPIO Bus Bit Start Offset | 00000b |
| 3:3 | 1 | Direction (0 = input/read, 1 = output/drive) | 1b |
| 2:2 | 1 | Negative Logic (reverse true/false) | 1b |
| 1:1 | 1 | Initial Value (true/false, subject to - logic) | 1b |
| 0:0 | 1 | Open Drain (true/false, subject to - logic) | 1b |

Table 1 illustrates the block of bits parameters that described a certain Power Supply. That Power Supply used a number of logical input/output signals. These were called general purpose input/output (GPIO) signals. Table 2 illustrates how one of these logical GPIO signals, GPIO Signal #4, can itself be described. Table 2, includes a reference to a logical GPIO pin (as opposed to the purely logical GPIO signal).

The logical description (scheme) for Power Supply depends upon one or more logical descriptions (scheme instances) for GPIO signals. There are a number of scheme-to-scheme dependency/delegation relationships described by this example. Notice that some of the physical aspects of a GPIO pin are also described in the block of bits shown in Table 2. These physical, GPIO-pin aspects are interleaved with the logical GPIO-signal description (in the block of bits shown in Table 2). For instance, the Negative Logic, Initial Value and Open Drain attributes are really physical attributes of a GPIO pin (and not logical aspects of the logical GPIO signal).

While this sort of logical/physical interleaving is often done (for various reasons), it does not change the nature of this inventions logical versus physical description pairing. Nor does it change the conceptual separation of the two. For instance, the logical GPIO pin number shown in Table 2 (as 0x60) is mapped/associated with the physical ASIC pin number (which happens to be 78 in this particular exemplary implementation). There is a one-to-one, identity mapping between the logical GPIO-signal description and the physical GPIO-pin description. Just where various GPIO pin/signal attributes appear is irrelevant across such a one-to-one (identity) mapping. This interleaving of descriptive aspects is isomorphic with a strict logical-physical separation.

Consequently, other factors dominate the implementation choice between interleaving (various descriptive aspects) and separation (of various descriptive aspects). For instance, different specific makes/models of a power supply might require different GPIO signal pulse widths. While an electrical signal pulse width is surely a physical aspect, this may be conveniently associated with the distinct logical power supply descriptions. It needs to be acquired from there into the physical description actually used. One may not want to set a single, static electrical signal pulse width for the pin. Although rare, different logical GPIO signals could be distinguished by the pulse width alone.

While this invention embraces all such refinements, the basic result remains—a logical description pairs with a physical description to form a complete declarative description of a given peripheral device (like a power supply).

Those of skill in the art will immediately realize that schemes for other sorts of peripheral devices, like fans, will all work in an analogous fashion. Fans, e.g., will use certain bits within the block of bits to identify which logical GPIO signals provide tachometer signals, which logical pulse width modulation (PWM) circuits to use (for a given fan instance) and so on. As with the power supply example, logical GPIO signals must then be mapped to physical GPIO pins (or to bit banged buses).

Ultimately, the physical description, appropriate for each instance of a logical scheme, is unambiguously referenced by the logical description values. Most often, the physical description to use (for any given logically described peripheral instance) is determined from the block of bits.

Host Hardware Environments

In some aspects, using the invention's approaches to declaratively describing the peripherals which constitute the hardware environment, this invention provides for declaratively describing a host hardware environment. For example, many embedded firmware/software hosts are essentially ASICs that embed many special purpose circuits. These integrated circuits might implement, e.g., a real-time clock, a random number generator, a UART (Universal Asynchronous Receiver Transmitter) or many other such functions. Each of these integrated sub-circuits can be treated as a specific sub-type of peripheral. In this case, the logical and physical descriptions according to embodiments of the present invention apply as if these circuits were just another peripheral scheme.

As with peripherals devices, the absence of some ASIC circuits, in some specific host hardware environment (for embedded software/firmware), will parallel the absence of some corresponding peripheral device. The same sort of (declarative) descriptive technique can indicate such an absence (for either the host ASIC circuit or for some equivalent peripheral device).

In practice, a logical scheme is introduced for things like non-volatile storage. As before, these logical descriptions are then mapped to corresponding physical description(s). For instance, one physical description can put non-volatile storage on the host ASIC while another physical description can put non-volatile storage on some off-chip flash memory part. Either way, it is logically just non-volatile storage. All such logically non-volatile storage components will share certain facets. The fixed-image, embedded software/firmware, according to embodiments of the present invention will manipulate each instance of non-volatile storage via the same logical non-volatile storage facet (interface). Some portion of the fixed-image, embedded software/firmware will be parameterized by the details found in the physical description. That portion will hide the differences between non-volatile storage on-chip and non-volatile storage off-chip. The myriad differences found in off-chip non-volatile storage hardware (i.e., so-called "flash" parts) will also be declaratively described, as was the case pattern illustrated for the Power Supply example.

Most of the embedded firmware/software part logic depends only on the prototype scheme facets, and not on either the logical description details/values or the physical description. Likewise, most of the embedded firmware/software part logic does not depend on any of the physical description details/values. Only the prototype scheme facets are visible. Almost all of the embedded software/firmware can treat the block of bits as opaque. Only a focused portion of lower-level implementation logic ultimately switches to the appropriate logic (based on the logical and/or physical description details in question).

Portability Across Host Hardware Environments Via Declarations

Figure 4:
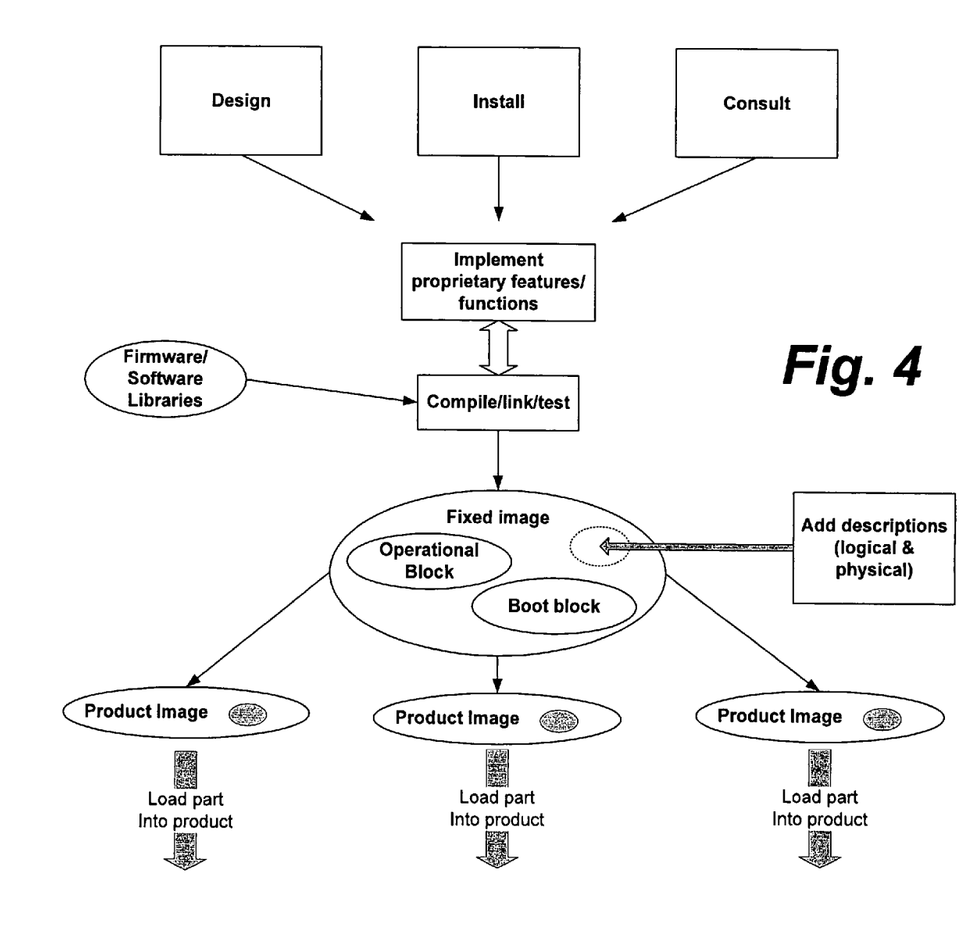
FIG. 4 depicts an exemplary use case workflow according to embodiments of the present invention.

The declarative description of the embedded firmware/software host hardware environment provides a novel degree of portability. Accordingly, this invention achieves a unique degree of portability without requiring any change to the firmware/software image (presuming a micro-controller core with instruction set similarities that are expected to appear across a family/line of ASICs). FIG. 4 illustrates one possible use case that leverages fixed firmware/software image portability according to embodiments of the present invention. As shown in FIG. 4, a single, possibly fixed-size, embedded firmware/software part image can be customized for a large variety of products. Initially the fixed firmware/software image is created ("Design Product", "Install" and "Consult" steps). The Consult step is used to review and consult firmware/software programming guides (API documents and the like). When these steps are complete, the system is implemented, followed by the "Compile, Link, Test" steps (repeated as needed). Typically, this is a cycle that is repeated as many times as necessary to produce a desired executable image.

The initial steps are preferably done only once. The "add" (or edit) descriptions step is done once for each target product. Embodiments of the present invention allows for the automation of this step which results in true, off-the-shelf reuse of a firmware/software part. The last depicted step involves a load of the part into one or more target products. Essentially, this step is the assembly of a final, finished product which includes the re-usable firmware/software part.

Example

The following example depicts operation of aspects of the present invention for a given microcontroller core. As shown above, at a physical level, there are abstractions (e.g., general purpose input/output (GPIO) pins) found on any given ASIC (these are the physical pins on the underside of the ASIC chip). On any particular host chip, one (or more) of these pins might be directly available for a logical GPIO signal. Sometimes there are not enough pins for all the various needs (of the embedded firmware/software image). One solution is to limit the number of logical GPIO signal descriptions (and thus reduce the number of paired physical GPIO pin descriptions). This approach causes the fixed image to sacrifice features and functions in order to conform to the limitations of the host ASIC. Simple changes to the appropriate descriptions suffice.

Alternatively, some product designers (i.e., board designers) may employ an off-ASIC pin expander mechanism—a distinct chip/part (a second, complementary chip). Along with the primary host chip, this expander chip becomes an integral part of the operational host hardware environment. This complication is introduced to this example to illustrate how this invention simply abstracts away such diverse host hardware environment details. In addition, this invention permits this to be done without requiring any change to a given firmware/software image.

Returning to the running Power Supply example, as illustrated above (in Table 1 and Table 2), the Power Supply uses a certain host ASIC pins for the implementation of various logical GPIO signals. These signals are used to implement one logical facet—i.e., the "Power On" behavior. Other GPIO signals (and corresponding GPIO pins) are used to implement other logical behavior facets.

We described above how the Power Supply scheme mapped logical GPIO signals to physical GPIO pins (on some specific host ASIC). We now describe how a logical GPIO signal can map into a logical bus. A collection of GPIO signals (and their corresponding GPIO pins) can be used together to affect a "bit-banged" bus. Some pin expander chips work this way. For instance, four GPIO signals might encode up to sixteen ($2^4$) different signal combinations. In these cases, the GPIOBusFlag listed in Table 2 is true, and so the GPIO bus related attributes of Table 2 are not moot.

Thus can be seen some of descriptive power of the use of the block of bits. It can be used to describe a series of simple GPIO interfaces. It can be used to describe which physical ASIC pins are used (for various GPIO signals) with the Power Supply in question. In can be used to describe how multiple GPIO signals are used together to form a crude bit-banged bus interface (to either a Power Supply or to an off-chip pin expander which is itself wired to a power supply).

The Power Supply prototype scheme comes with a generic, default implementation. This implementation logic drives off the contents of the block of bits. If the default behaviors are inappropriate for some specific Power Supply, each behavioral facet can be replaced with alternate behaviors (which are available for as-needed use with the Power Supply scheme). Simple edits to the prototype scheme can replace any of the default prototype behaviors.

Only a few, isolated, focused bits of embedded software/firmware logic need to know anything about this particular block of bits interpretation. All of the logic associated with the Power Supply scheme form a natural module. This module contains the only logic that should have any knowledge of how the block of bits should be interpreted (for a Power Supply scheme instance). While some applications of this invention might want to dynamically load modules, a given range of desired applicability can map to a certain, fixed set of modules. Such modules can be pre-loaded into a fixed-size executable image. Once this is done, declarative changes to the description block are all that is needed (see FIG. 3). This sort of fixed-size executable image becomes a re-usable software/firmware part.

Figure 3:
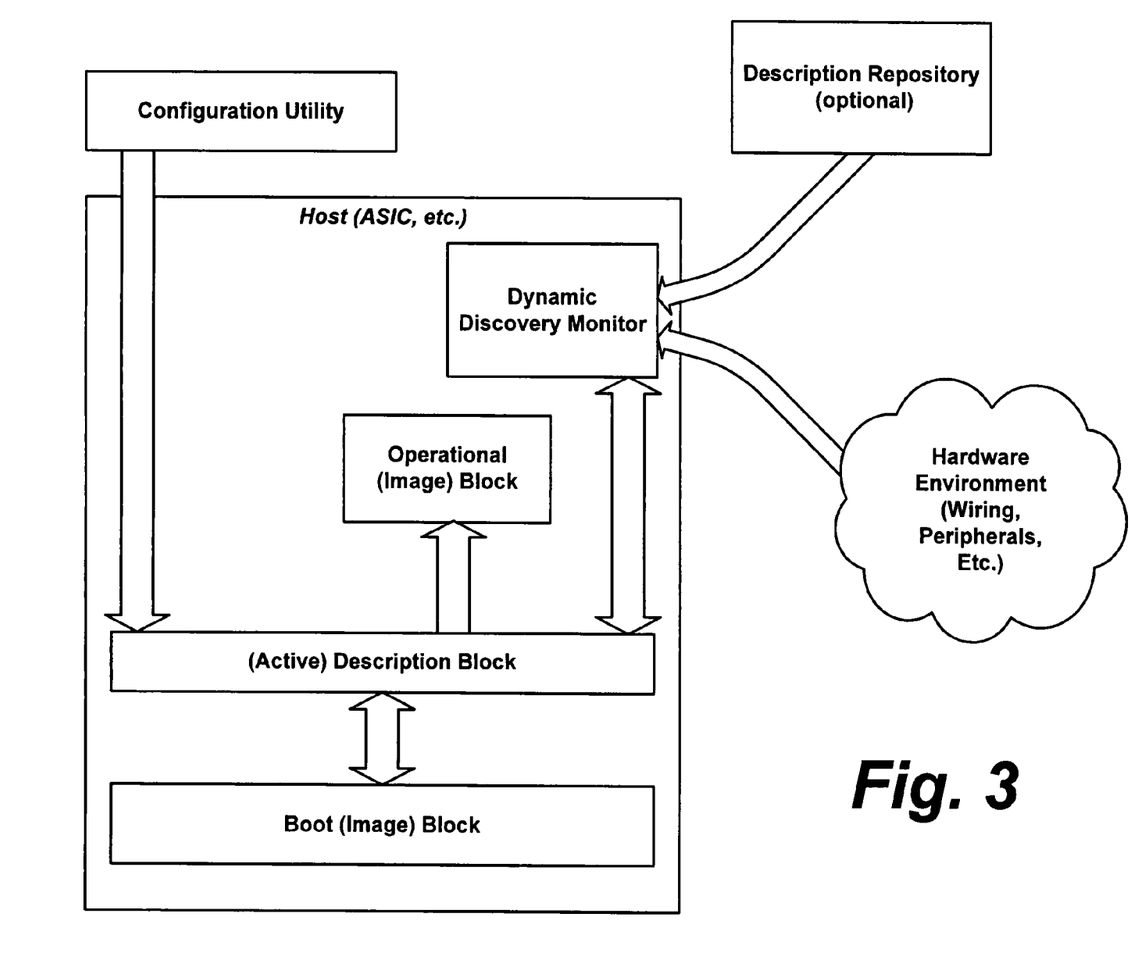
FIG. 3 depicts an exemplary deployment architecture according to embodiments of the present invention.

FIG. 3 depicts a deployment architecture according to embodiments of the present invention. This diagram depicts an application of this invention to an embedded firmware part. This particular firmware part features a fixed-size firmware image divided into three (potentially fixed-sized) parts: boot block, description block and operational block.

As shown in FIG. 3, a deployment architecture according to embodiments of the present invention includes a configuration utility, a host and an optional description repository. The configuration utility is used to describe host ASICs and peripheral devices (e.g., for some entire product line), to configure a part after product assembly. (Note that the part is configured, not customized). The host (ASIC, etc.) includes a description block and a boot (image) block. The description block contains logical a physical descriptions and describes both the host ASIC and peripheral devices. It can pre-allocate a fixed amount of storage (to form a so-called, fixed-image firmware/software "part") or it can dynamically allocate storage from a pool (which may or may not include off-chip/secondary storage). The host declares schemata types known (self-describing). The boot block is a fixed image which calls described/parameterized initializers (especially for each peripheral device present) and mediates and installs firmware and software updates, as needed. An operational block is a fixed image parameterized via descriptions.

A dynamic discovery monitor (DDM) can be used to enable collaboration with a centralized description repository. In some embodiments of the present invention, the DDM continuously detects peripherals, activates or uploads descriptions and/or monitors peripheral presence.

An optional description repository describes the universe of (known/supported) host ASICs; the universe of (known/supported) peripheral devices and then supplies needed (physical/logical) descriptions on-demand (based, e.g., on discovery of new devices by the DDM).

Host (ASIC) Descriptions Complement Peripheral Descriptions

A collection/container/table of logical descriptions is used when describing a host/ASIC processing support platform (for some software/firmware part). Each description (block entry) corresponds to an instance of some corresponding host ASICs circuit/sub-system. A similar collection/container/table of logical descriptions usually exists for each peripheral device. Together, these logical (and corresponding descriptions) comprise the description block. (see FIG. 3).

Generally, the distinction between what is an ASIC circuit/component-system and what is a peripheral device/component-system is not always precise. This makes it quite natural to unify the nature of these descriptions. This invention applies equally well to both host and peripheral support needs.

Again, the logical and physical host descriptions are conceptually distinct. The logical host aspect/component descriptions supply values that eventually map to some named/identified physical description. As with peripheral descriptions, any one-to-one logical-to-physical identity mappings make it possible to interleave the two descriptions. As before, this is typically done as an implementation convenience. Prototype schemata may be created for ASIC circuits/component-systems like a random number generator, a UART port, non-volatile storage, tachometer circuits, pulse width modulator circuits and the like. A collection of such prototype schemes comprises a host schema which, when combined with a peripheral schema, form a (master) system schema.

Note that host (ASIC) and peripheral (device) descriptions can be mix-and-matched. For example, a palette of individual peripheral schemata can define a peripheral schema for some (particular vendors) product line. As new models enter this product line, they might regularly re-use the same peripheral schema. They might or might not re-use the same host schema. The host schema can be swapped in/out quite independently of the peripheral schema.

Those skilled in the art will immediately realize that many other sorts of useful scheme groupings can be affected. Other than for size constraints, a fixed-size executable image, according to embodiments of the present invention, may support all (or a very large number) of individual prototype schemes (for both various hosts and various peripherals). As a practical (and economic matter), carrying around unused schemes is hard to justify (past a certain degree). Furthermore, the executable image itself will have host instruction set dependencies (i.e., it will depend on the micro-controller processing core—e.g., H8, ARM, etc.).

This invention provides for a system wherein there is rarely any requirement for any embedded firmware/software part changes (especially across a select product line). The host hardware can be designed, and then desired software/firmware part(s) can be layered on. Nothing needs to be re-compiled, nothing needs to be re-initialized, and no run-time changes to the embedded firmware/software image are required (no overlay changes, no dynamic linking, no dynamic loading, etc.). A single, fixed software/firmware image can be used across a range of host hardware and across a range of peripheral devices. The product line designer matches the range of applicability of his embedded firmware/software part to his product line plans. This dramatically speeds up integration of the part and dramatically reduces time-to-market for new product model development, while dramatically reducing quality assurance costs. In addition, this makes it possible to support many/most hardware changes in the field (through small descriptive declarations). In fact, adaptation to hardware changes can be fully automated (via a dynamic discovery monitor—see FIG. 3).

Dynamic Hardware Environments

In practice, a host hardware environment rarely changes dynamically (at run-time). Once a product is shipped, the host hardware environment is typically fixed. If the software/firmware host is an ASIC (chip), it might even be fixedly connected to a printed circuit board (PCB). Although rare, an ASIC can change. For example, complementary support chips might be populated into waiting sockets. The host ASIC chip itself can be in a socket. This means that it too might be subject to field upgrades. Alternatively, the host might be on a card (i.e., a daughter card, mezzanine card, bus card, etc.). These too can by dynamically added, removed, swapped, etc.

Peripheral hardware environments, on the other hand, change more frequently. E.g., workload bearing (line/CPU) cards (e.g., blades) are often added/removed; mezzanine card slots/headers can be filled with optional hardware products; disk drives come and go; etc.

Accordingly, in some embodiments, the present invention supports changing peripheral hardware environments by providing for automating changes to the description block when needed (see FIG. 3). In particular, in some embodiments, the present invention supports discovery of changes and related updates. Discovery, in this context, involves detecting changes in the hardware environment. Those skilled in the art will understand that there are many ways to implement discovery. Most discovery technologies are very particular to a specific hardware environment. For instance, some hardware is designed to raise some form of asynchronous event (via some interrupt line, an I2C bus message or some other form of input). (An I2C (Inter-IC) bus is a bi-directional two-wire serial bus that provides a communication link between integrated circuits (ICs).) Some convention exists to then name/identify the hardware changes announced by this asynchronous event.

Regardless of how discovery takes place, this invention provides for the ability to address discovered changes by simply activating/de-activating different peripheral device descriptions. Alternatively, in some embodiments, this invention can obtain needed peripheral device descriptions from a remote source (e.g., over a network, via a serial port or the like). The Dynamic Discovery Monitor (DMM) according to embodiments of the present invention is shown in FIG. 3.

Description changes themselves can trigger associated logic—which typically employs some event-condition-action (ECA) trigger mechanism/method. In some aspects, embodiments of the present invention include the option of creating a so-called "active" repository of logical/physical descriptions. This amounts to an active description block (see FIG. 3). Again, this can be done without any change to the nature/size/layout of fixed software/firmware image. No new software/firmware needs to be dynamically linked or dynamically loaded. There is no need for a software/firmware re-initialization.

The block-of-bits may be considered to be like an opaque union of all the different data structures that this block of bits (64-256, or more) might represent—within a given schema. The layout/contents of the block-of-bits depends upon the logical/physical description scheme being used. Facet logic (from getters/setters to operational behaviors—like power on/off/recycle) always applies to a given scheme (with the schema). Since the facet logic knows what assumptions it can make about its scheme, at run-time it can appropriately cast the block-of-bits it receives.

Most logic is higher-level than facet logic, which means that most logic treats the block-of-bits as opaque. Most logic just feeds in the given instance's corresponding description details/values into facets as the block-of-bits. Most logic knows nothing about how to interpret/use this block-of-bits. In this sense, the block-of-bits is usually opaque. However, the specific facet logic does know just how the block-of-bits is laid out (and thus how to interpret/use it).

Aspects of the present invention may be considered to be a way to declaratively describe entities with a nested/hierarchy of prototypes (rather than types), along with ways to make all prototype slot/facet interfaces uniform/consistent (within a given over-arching schema). Within a given schema, some number of bits (e.g., 64, 128 or 256) are always passed as a universal/singular argument to all prototyped behaviors/methods/functions.

The binding of a type to the usually-opaque block is delayed, past run-time initialization, all the way down to the entry point of scheme-specific, scheme-facet-implementation module. This type-to-block-of-bits binding is repeated whenever this module is entered. By late binding in this manner, the present invention provides a way to greatly expand the expressive range of declarative (prototyped) schema. This, in turn allows data-driven firmware/software logic, according to embodiments of the present invention, to be far more widely applicable which, in turn, makes a single, fixed-size firmware/software image far more flexible/applicable/valuable.

Although the present invention has been described with reference to specific exemplary embodiments and examples, it will be evident that various modifications and changes may be made to these embodiments without departing from the broader spirit and scope of the invention as set forth in the claims. Accordingly, the specification and drawings are to be regarded in an illustrative rather than restrictive sense.

We claim:

1. A method for producing a fixed-size generic firmware image for a hardware device, parameterized for a plurality of component environments, the method comprising:
   providing a logical description of aspects of said plurality of component environments;
   providing a physical description of physical aspects of said plurality of component environments;
   associating said logical description with said physical description;
   providing said firmware image to include a plurality of generic parameterized functions to support aspects of said hardware device in each of said plurality of component environments, each of said plurality of generic parameterized functions supporting at least one of said aspects of said hardware device in each of said plurality of component environments, wherein an actual argument to at least one of said generic parameterized functions is a fixed-sized non-typed block of bits whose interpretation is context sensitive, wherein the interpretation of the fixed-size non-typed block of bits by a particular generic parameterized function depends on the logical and physical aspects of the particular component environment, and wherein actual arguments to said parameterized functions are bound at run time.

2. A method as in claim 1 wherein said hardware device is selected from the group comprising: power supplies, busses; fans, disk drives, sensors, and flash parts.

3. A method as in claim 1 wherein each block of bits is the same fixed size.

4. A method as in claim 3 wherein each block of bits is between 64 and 256 bits long.

5. A method as in claim 1 wherein the firmware image comprises:
an operational block including abstract device driver interfaces for said hardware device; and
a description block that includes said logical and physical descriptions.

6. A method as in claim 1 wherein the actual argument to each of said parameterized functions is cast at run-time into a run-time context determined type.

7. A method as in claim 3 wherein the size of the type is less than or equal to the fixed size of the block of bits.

8. A method as in claim 1 further comprising:
loading said firmware image into a host;
providing a dynamic discovery monitor in said host to monitor hardware connected to said host and to activate aspects of said firmware in response to discovered hardware changes.

9. A method as in claim 8 wherein said host is an Application Specific Integrated Circuit (ASIC).

10. A method as in claim 1 wherein physical description may includes one or more of the following: the number of output pins on a chip; the assignment, the memory locations of certain data, various clock and timing parameters, temperature parameters.

11. A method for producing a fixed-size firmware image for a plurality of hardware devices, each parameterized for a plurality of component environments, the method comprising:
(A) for each of said plurality of hardware devices,
(a1) providing a logical description of aspects of each of said plurality of component environments;
(a2) providing a physical description of physical aspects of each of said plurality of component environments;
(a3) associating said logical description with said physical description;
(B) providing said firmware image to include a plurality of generic parameterized functions to support aspects of each of said plurality of generic parameterized functions supporting at least one of said aspects of said hardware device in each of said plurality of component environments, wherein actual arguments to each of said parameterized functions are provided as untyped blocks of bits, wherein the interpretation of the fixed-size non-typed block of bits by a particular generic parameterized function depends on the logical and physical aspects of the particular component environment, and
each of said hardware devices in each of said plurality of component environments,
wherein actual arguments to said parameterized functions are bound at run time.

12. A method as in claim 11 wherein each of said hardware devices is selected from the group comprising: power supplies, busses; fans, disk drives, sensors, and flash parts.

13. A method as in claim 11 wherein each block of bits is the same fixed size.

14. A method as in claim 13 wherein each block of bits is between 64 and 256 bits long.

15. A method as in claim 11 wherein the firmware image comprises:
an operational block including abstract device driver interfaces for each of said hardware devices; and
at least one description block that includes said logical and physical descriptions.

16. A method as in claim 15 further comprising:
loading said firmware image into a host;
providing a dynamic discovery monitor in said host to monitor hardware connected to said host and to activate or modify aspects of said firmware in response to discovered hardware changes.

17. A method as in claim 16 wherein said host is an Application Specific Integrated Circuit (ASIC).

* * * * *